Patented May 12, 1953

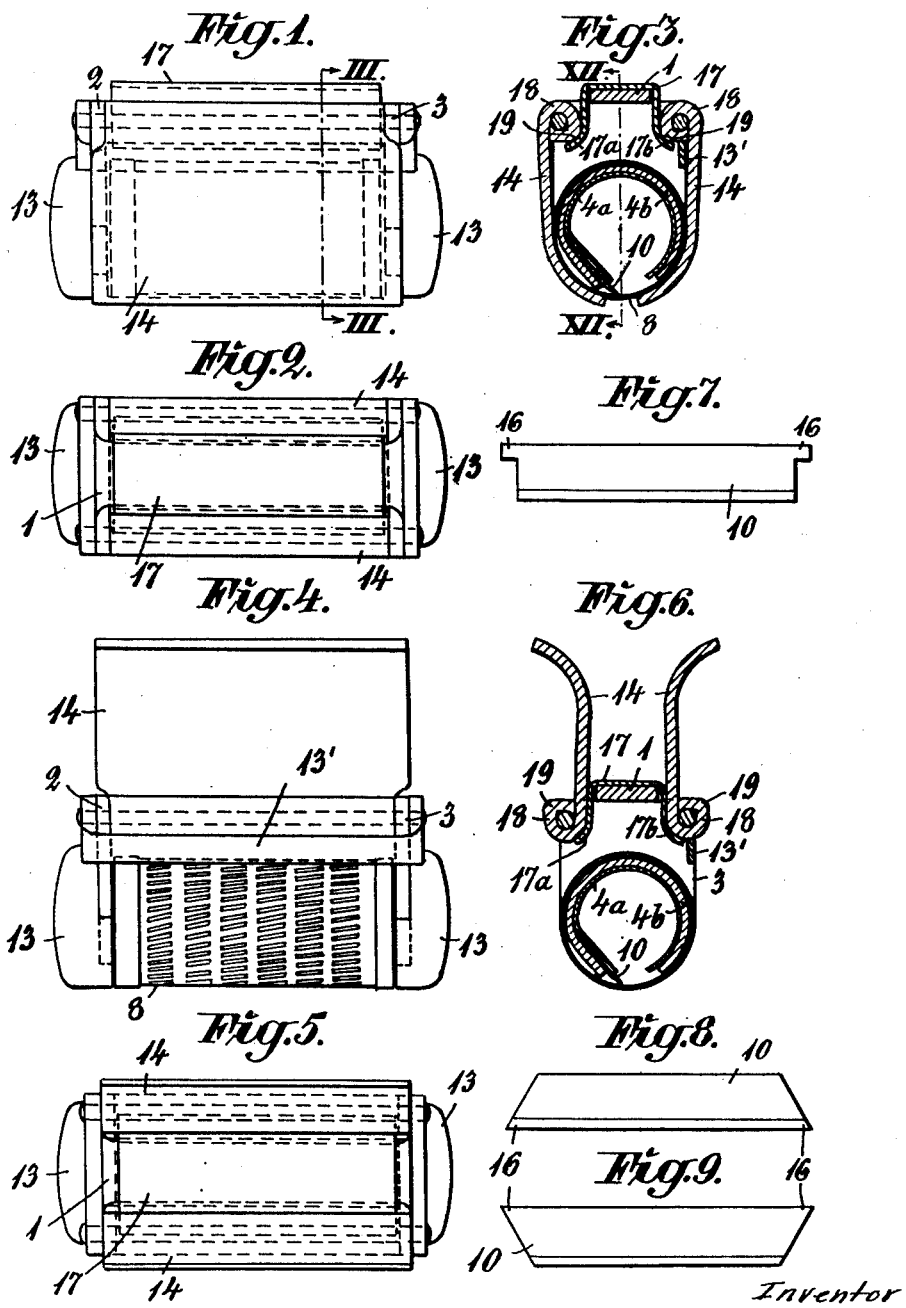

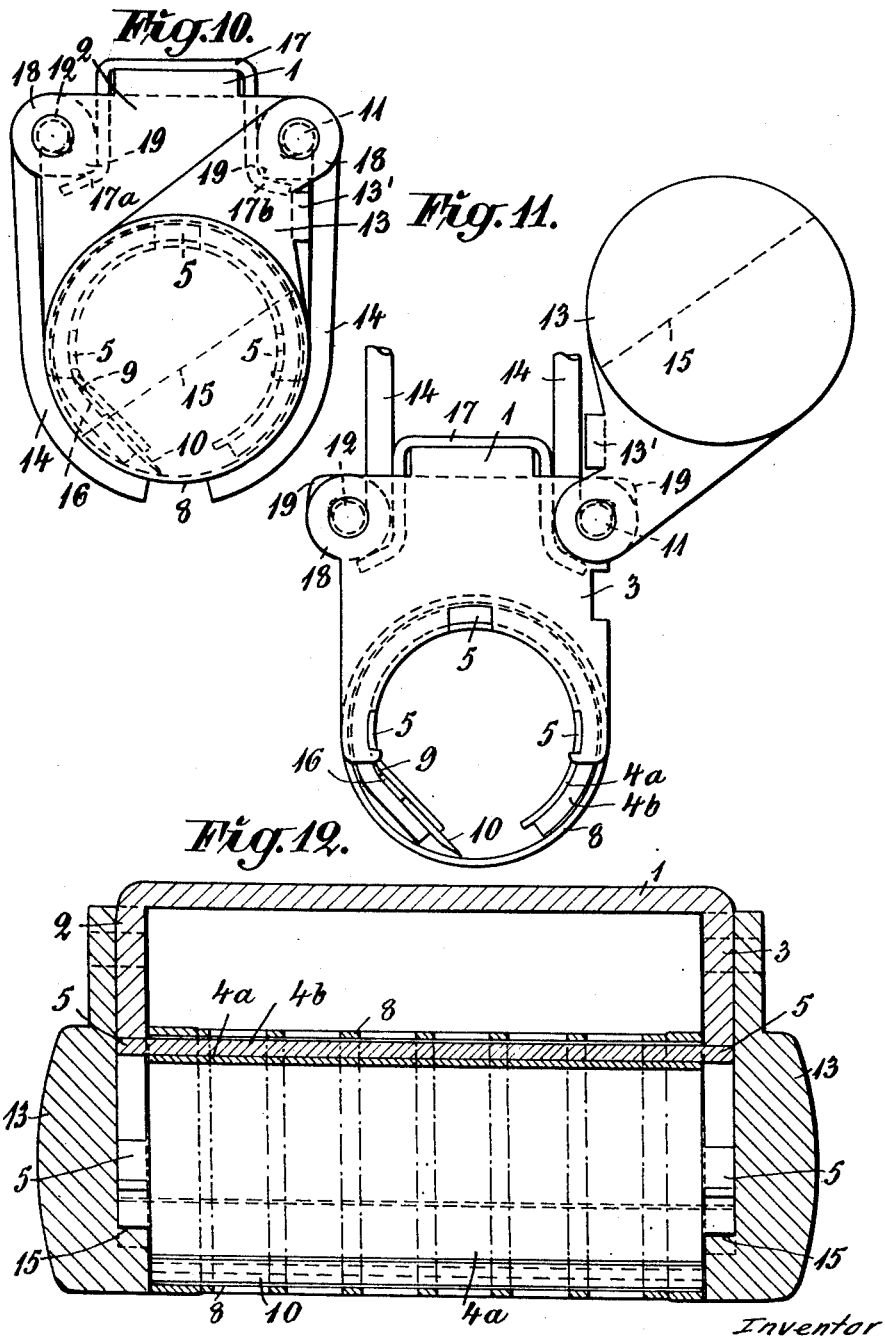

2,637,902

UNITED STATES PATENT OFFICE 2,637,902

SHAVING APPARATUS

Jonas Åke Gregorius Malmberg, Stockholm, Sweden

Application December 27, 1950, Serial No. 202,843
In Sweden November 22, 1950

3 Claims. (Cl. 30—43)

The present invention relates to an improvement in such shaving-apparatus having a finely slitted rotatably mounted drum and a fixed knife applied inside and in the longitudinal direction of the said drum, and the object of the invention is to obtain an effective operating and durable shaving apparatus of this type, the invention being chiefly characterized by an open-ended casing provided with a longitudinal slot and arranged inside the drum for the purpose of guiding the same and connected with a handle, the one of the longitudinal edges of the slot in the casing being provided with a longitudinal groove for inserting an exchangeable knife, and movable locking means which in the locking position cooperate with the ends of the knife in order to keep the knife fixed in the longitudinal direction and also crosswise.

This arrangement thus renders it possible to use exchangeable knives which, after being inserted in the groove in the one edge of the slotted casing is firmly locked by the locking means.

According to the invention, the ends of the casing can be connected with the branches of a U-shaped frame belonging to the handle, these branches being provided with openings corresponding to the open ends of the casing, so that the knife may be easily removed at the same time as the interior of the shaving-apparatus is easily accessible for cleaning.

Other features of the invention will in the following be more closely described in connection with the accompanying drawings.

Figs. 1 and 2 show the apparatus when folded up and seen from the side and from below, respectively, whereas Fig. 3 is a section according to the line III—III in Fig. 1.

Figs. 4 and 5 show from the side and from below, respectively, the apparatus when opened up, whereas Fig. 6 is a section of the apparatus in open state, corresponding to Fig. 3.

Figs. 7, 8 and 9 illustrate different embodiments of the knife.

Fig. 10 shows, in a larger scale, the apparatus in end view, when folded up, while Fig. 11 shows the apparatus in the same view, but with the locking means of the knife in an unlocking position.

Fig. 12, finally, is a section seen from line XII—XII in Fig. 3 and in a larger scale.

The shaving-apparatus contains a U-shaped frame with a central part 1 and branches 2, 3 protruding from the ends thereof, serving as brackets for an open-ended casing 4a, 4b, which is cut up longitudinally for obtaining a slot and at the ends provided with protruding laps 5, which extend into corresponding openings in the branches 2, 3.

Around the casing 4a, 4b, thus firmly attached to the branches 2, 3 of the frame, a finely slitted drum 8 is loosely applied, which with some clearance is freely turnable around the casing, which consists of two cylindrically bent plates 4a and 4b, the one within the other. Along one of the longitudinal slot-edges of the casing there is a groove 9 for the knife 10. This groove 9 can for example be milled but it can also, as shown in the drawing, be obtained by bending the plates 4a, 4b somewhat from each other as shown in Fig. 11 on the drawing. Furthermore, locking means 13 are pivotally mounted around a shaft 11 fixed in the branches 2, 3 of the frame, and around this shaft 11 and another shaft 12 there are also pivotally mounted two handles 14 which, when folded up around the drum 8, also serve as protecting plates.

According to the embodiment illustrated in the drawings the locking means 13 consist of two cover-shaped parts, each one at its underside being provided with a ledge 15, which are so arranged that, when the cover-shaped locking means 13 have been turned upon the shaft 11 in locking direction, the said ledges 15 cooperate with the ends of the knife 10, said ends for this purpose being provided with shoulders 16, protruding somewhat beyond the ends of the casing 4a, 4b, so that the knife 10, resting in the groove 9, is prevented from being displaced in the longitudinal direction as well as crosswise.

As seen on the drawing, the two locking means 13 are suitably joined with one another by means of a longitudinal bar 13'.

The handles 14 are as already stated, pivotally mounted around the shafts 11 and 12, which extend between the frame-branches 2, 3, so that a good and reliable bearing is secured. In order to obtain a resilient holding of the handles 14, when they are in folded-up position, enclosing the drum 8, the central part 1 of the U-shaped frame is made comparatively narrow and like a rod, so that a groove-shaped, resilient plate 17 can be applied over the central frame part 1, the edges 17a, 17b of which plate cooperate with the hinge-parts 18 of the handles 14. These hinge-parts 18 are provided with a projection 19, protruding at a somewhat greater radial distance from the shafts 11, 12, so that when folding up the handles 14, a certain resilient snap-locking effect is obtained in cooperation with the plate edges 17a, 17b.

The handles 14 and the locking means 13 can of course be constructed in many other ways.

Having now particularly described the nature of my invention and the manner of its operation, what I claim is:

1. In a dry shaver of the type including a rotary slitted drum and an interior fixed blade in shearing relation thereto, a support for said blade comprising a longitudinally slotted open-ended hollow cylindrical casing disposed within said drum, a longitudinal edge of said casing being formed to provide a relatively deep and narrow groove adapted to receive and position said blade with its cutting edge contacting the inner surface of said drum, a frame supporting said casing in fixed relation thereto, and means pivotally mounted on said frame on an axis parallel to the longitudinal axis of said casing and swingable to a position closing both ends of said casing, thereby retaining said blade against longitudinal displacement.

2. A dry shaver according to claim 1, including a pair of cover plates pivoted on said frame on axes parallel to and on opposite sides of a plane extending centrally through said frame and containing the longitudinal axis of said casing, said plates serving in one terminal position to cover said drum and in the other terminal position to form a handle for the shaver.

3. A dry shaver according to claim 2, including resilient means acting between said frame and said plates and serving to urge them toward their first-named terminal position.

JONAS ÅKE GREGORIUS MALMBERG.

References Cited in the file of this patent
UNITED STATES PATENTS

| Number | Name | Date |
|---|---|---|
| 2,331,646 | Arey | Oct. 12, 1943 |